United States Patent [19]
de Deyne

[11] Patent Number: 5,097,988
[45] Date of Patent: Mar. 24, 1992

[54] DEVICE FOR WEIGHING FREE-FLOWING OR STREWABLE SOLID MATERIAL, IN PARTICULAR GRANULAR OR POWDERED MATERIAL, DURING THROUGHFLOW

[76] Inventor: Jacques R. A. de Deyne, Heirweg 8, 9990 Maldegem, Belgium

[21] Appl. No.: 485,235

[22] Filed: Feb. 26, 1990

[30] Foreign Application Priority Data

Feb. 27, 1989 [NL] Netherlands ............. 8900483

[51] Int. Cl.$^5$ ............................. G01F 11/10
[52] U.S. Cl. ........................... 222/77; 222/36;
   222/368; 177/91; 177/110
[58] Field of Search ............ 222/14, 36, 55, 56,
   222/72, 295, 360, 368, 491, 500; 177/90-93,
   110, 201, DIG. 5

[56] References Cited

U.S. PATENT DOCUMENTS

| 1,484,506 | 2/1924 | Killian | 222/368 |
| 4,076,150 | 2/1978 | Didrickson | 222/368 |
| 4,130,171 | 12/1978 | Smith et al. | 177/91 |
| 4,511,067 | 4/1985 | Martin et al. | 222/360 |
| 4,526,213 | 7/1985 | Martinez | 222/77 |

FOREIGN PATENT DOCUMENTS

| 456210 | 2/1975 | U.S.S.R. | 177/110 |
| 623112 | 9/1978 | U.S.S.R. | 222/77 |
| 1290076 | 5/1985 | U.S.S.R. | 222/368 |

Primary Examiner—Michael S. Huppert
Assistant Examiner—Shari Wunsch
Attorney, Agent, or Firm—Weintraub, DuRoss & Brady

[57] ABSTRACT

A device for weighing free-flowing or strewable solid material, in particular granular or powdered material, during throughflow, includes an enclosed housing a rotor which is essentially freely rotatable about an essentially horizontal axis of rotation and has at least two adjacent compartments viewed in the direction of rotation, an inlet in the housing for feeding material to be weighed to one of the compartments of the rotor an outlet in the housing for discharging weighed material from the compartments of the rotor, and retaining devices acting on the rotor. The retaining devices includes a magnetic system which is designed to exert on the rotor a retaining force of a predetermined maximum magnitude acting in the opposite direction to the direction of rotation of the rotor.

21 Claims, 4 Drawing Sheets

DEVICE FOR WEIGHING FREE-FLOWING OR STREWABLE SOLID MATERIAL, IN PARTICULAR GRANULAR OR POWDERED MATERIAL, DURING THROUGHFLOW

The invention relates to a device for weighing free-flowing or strewable solid material, in particular granular or powdered material, during throughflow.

Such devices are known. A certain type works on the balance principle. One balance arm has fitted on it a pan which can be tilted in a vertical plane, and which contains a partition dividing the pan into two compartments lying adjacent to each other. The tilting point of the pan lies on the balance arm and below the centre of gravity of the pan. A weight is fitted on the other balance arm. For weighing, one of the compartments is filled with the material to be weighed. In order to prevent the pan from tilting under the influence of the torque exerted by the material in the compartment in question, provision is made above the pan for a fixed retaining element, against which the partition rests during filling of the compartment When so much material has been placed in the compartment that the balance arm at the pan side tips, the pan moves down so far that the partition is no longer held by the retaining element. The pan then tilts in the direction of the filled compartment, while the other compartment comes to rest below the material infeed, and the filled compartment is emptied. The balance arm then turns back again under the influence of the weight on the other balance arm, and the pan then goes up again, while the partition comes to rest again against the retaining element, but towards the other side now. The other compartment is then filled, and the cycle is repeated. The filled weight of each compartment can be set using the weight on the other balance arm.

The disadvantage of this system is that it has a number of mechanical transmissions, which means that the accuracy of the weighing leaves something to be desired, certainly if the device is being used in a very dusty environment, causing heavy pollution of the moving parts.

There are also electronic weighing systems which are accurate, but they are very expensive.

The object of the invention is then to produce a weighing device which, on the one hand, is very accurate and can be used in a very dusty environment without this having an adverse effect on the accuracy of the weighing, and which, on the other, is of a simple and relatively cheap design.

This object is achieved according to the invention by a device for weighing free-flowing or strewable solid material, in particular granular or powdered material, during throughflow, comprising:

- a rotor which is essentially freely rotatable about a fixed, essentially horizontal axis of rotation and has at least two compartments lying adjacent to each other, viewed in the direction of rotation;
- means for feeding material to be weighed to one of the compartments of the rotor;
- means for discharging weighed material from the compartments of the rotor;
- retaining means acting on the rotor, which are designed to exert on the rotor a retaining force of a predetermined maximum magnitude acting in the opposite direction to the direction of rotation of the rotor.

The device according to the invention has no, or virtually no, moving parts apart from the rotor, which only carries out a rotary movement about its axis, so that the accuracy of the weighing is not affected by pollution of these moving parts. With the device according to the invention it is possible to achieve great accuracy of weighing through the fact that the quantity by weight of material going into one of the compartments each time is determined only by the maximum magnitude of the retaining force exerted by the retaining means on the rotor, and said retaining force can be adjustable and is also constant as regards time. Moreover, the design of the device according to the invention is simple and therefore relatively cheap.

The retaining means preferably comprise a magnetic system which supplies the retaining force and expediently has at least one permanent magnet fixed relative to the axis of rotation of the rotor, or mounted on the rotor, and also another magnetic or magnetizable element which is mounted on the rotor or fixed relative to the axis of rotation of the rotor, and which is always a distance from the permanent magnet. The retaining force here is determined by the magnetic force exerted on the other element by this at least one permanent magnet. The maximum magnitude of the retaining force is thus determined by the maximum magnitude of the magnetic force exerted on the other element by the at least one magnet. Since there is no contact at all between the at least one permanent magnet and the other magnetic or magnetizable element, no friction and/or wear occurs either, which benefits the accuracy of the weighing. Modern permanent magnets have a very constant magnetic field in terms of time, so that if such magnets are used, the magnetic force exerted can also be very constant in terms of time.

Preferred embodiments of the device according to the invention are described in the sub-claims and are described in the example of an embodiment below with reference to the drawing, in which:

Figure 1:
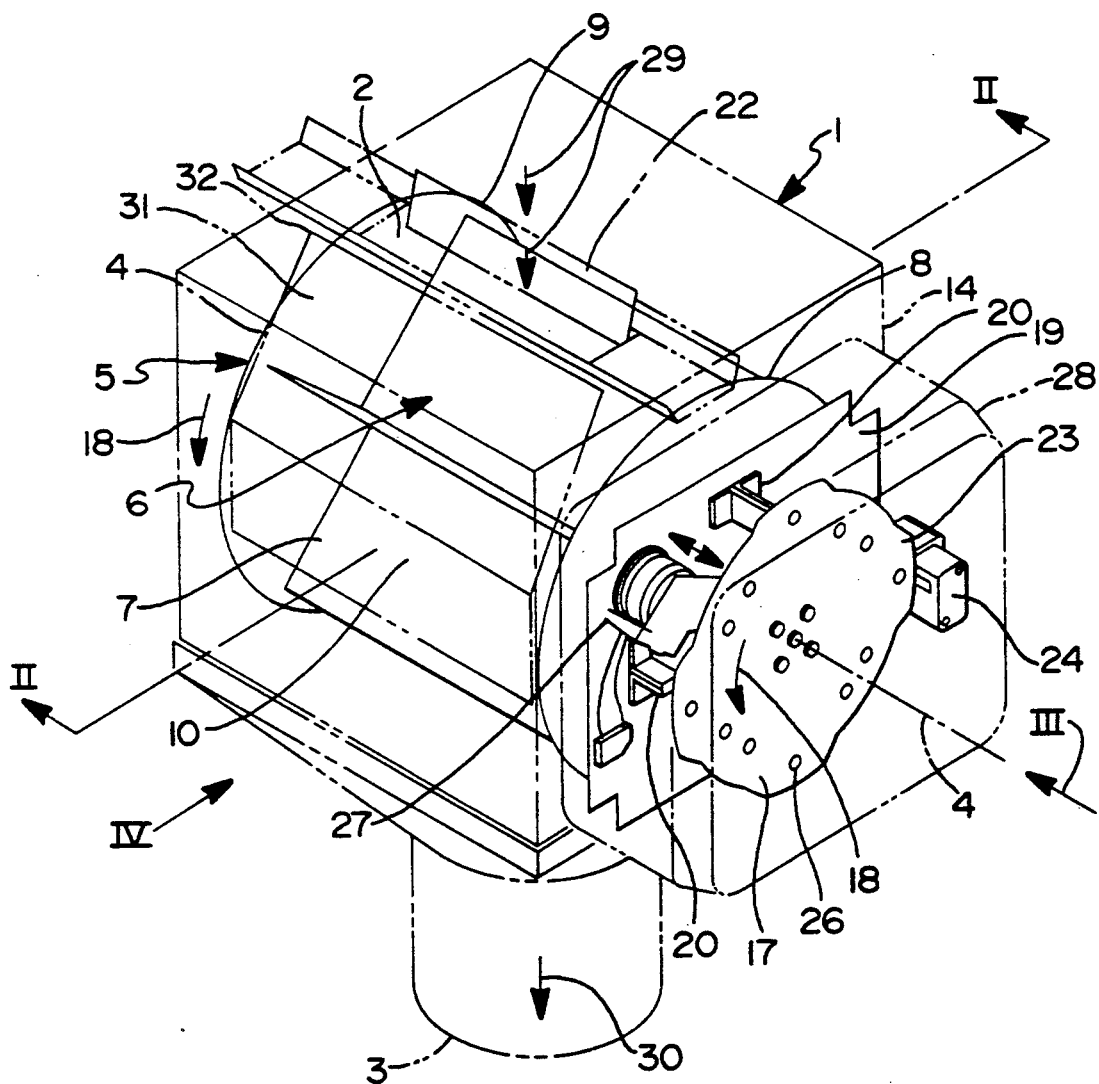
FIG. 1 is a schematic view in perspective of a specific embodiment of the device according to the invention.

The device according to the invention shown in FIGS. 1 to 4 comprises a housing 1 which is provided at the top with a feed aperture 2 for the material to be weighed, and is provided at the bottom side with a discharge aperture 3 for the weighed material. Apart from the material feed aperture 2 and the material discharge aperture 3, the housing 1 is closed all the way round. Inside the housing is a rotor 5 which can rotate freely about a fixed, essentially horizontal axis of rotation 4. The rotor 5 has a part in the form of a blade wheel 6 with four blades 7 extending essentially from the axis of rotation in the radial direction and parallel to the axis of rotation 4. The blades 7, together with two end plates 8 and 9 which are fitted at both sides of the blade wheel 6 and which lie at right angles to the axis of rotation of the rotor and are connected to the side edges of the blades 7, form four compartments 10. The blades 7 are positioned at an angle of 90° relative to each other, so that the compartments cover a sector of 90°. The blade wheel is fitted in the housing 1 on a shaft 11, which is supported by means of bearings 12 and 13 in the front and rear wall 14 and 15 respectively of the housing 1. The shaft 11 projects through the front wall 14 of the housing 1 at the bearing 13.

A disc 17 is fitted on the part 16 of the shaft 11 projecting beyond the housing and is fixed to the shaft part 16. As will be explained in further detail below, the disc 17 is used for positioning the rotor 5, and in particular the blade wheel 6 of the rotor, in the direction of rotation.

The device is provided with retaining means which are designed so that they exert a retaining force of a predetermined maximum magnitude on the rotor 5 in a direction opposite to the direction of rotation of the rotor 5. The direction of rotation of the rotor is indicated in the figures by the arrows 18. These retaining means comprise four first permanent magnets 20 fitted on a plate 19 fixed to the housing 1 and positioned at right angles to the axis of rotation of the rotor, and four second permanent magnets 21 fitted on the disc 17 of the rotor 5. The first permanent magnets 20 and the second permanent magnets 21 lie on circles of differing diameters which are concentric relative to the axis of rotation 4 of the rotor. The diameters of the circles on which the first and second permanent magnets 20, 21 lie are such that the second permanent magnets 21 can move close up along the first permanent magnets 20. The first permanent magnets 20 lie at an angular distance of 90° from each other, like the second permanent magnets 21. This design means that the rotor is retained with a specific retaining force in four positions in the direction of rotation. The retaining force is determined by the force which the first and second magnets exert on each other. This force depends on different factors, such as the strength of the magnets and the distance between the first and second magnets 20, 21.

In the direction of rotation of the rotor 5 the position of the disc 17 with the second permanent magnets 21 relative to the blade wheel 6 is such that in the four more or less fixed positions of the rotor determined by the magnets 20 and 21 one of the compartments 10 of the blade wheel 6 lies below the material feed aperture 2, while an upward-extending blade 7 of the blade wheel lies with its outside edge in the direction of rotation of the rotor in front of a material guide plate 22 (see FIG. 2) fitted in the material feed aperture 2. The first and second magnets 20, 21 are preferably set up in such a way that they repel each other. It is, however, also possible to set up the magnets 20 and 21 in such a way that they attract each other. It is even possible to replace either the magnets 20 or the magnets 21 by a block of iron or other material which is attracted by a magnet.

Figure 3:
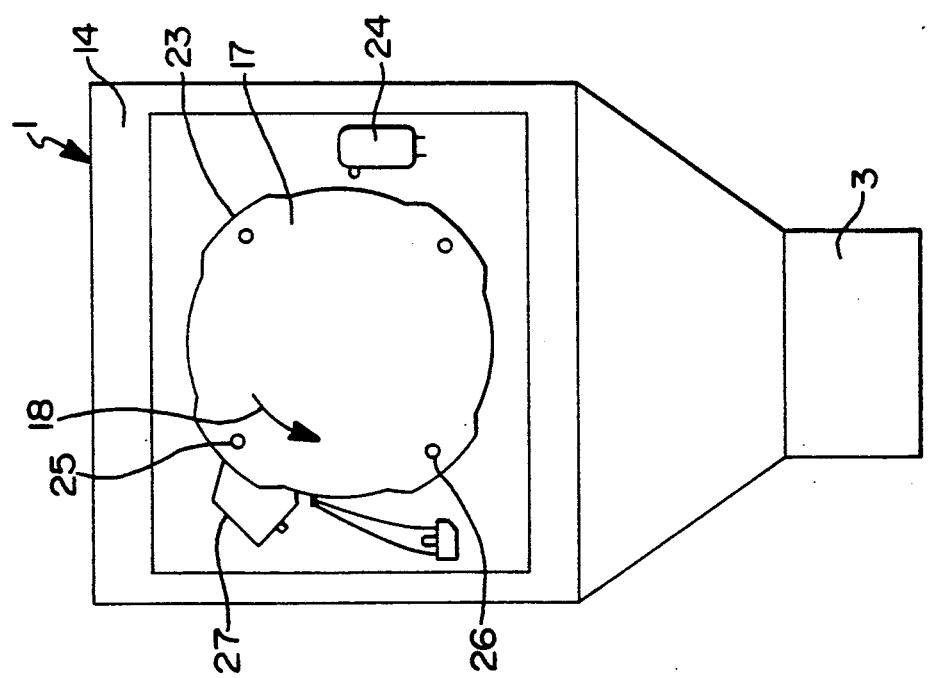
FIG. 3 is a schematic view of the device of FIG. 1, viewed in the direction of the arrow III.

Four cams 23, which on rotation of the rotor 5 operate a fixed electric switch 24, are fitted on the outer periphery of the disc 17 (see FIG. 3). In this way the number of quarter turns of the rotor can be detected and recorded.

The device is also provided with locking means for locking the rotor in a particular position. These locking means comprise a pin 25 which is movable to and fro in the axial direction of the rotor, and which in the locking position can fall into one of four apertures 26 provided in the disc 17. The pin 25 is moved to and fro by an electromagnet 27 fitted on the plate 19. The disc 17, the plate 19, the magnets 20 and 21, the electric switch 24 and the electromagnet 27 are accommodated outside the housing 1 of the device in a closed cabinet 28, which means that they are protected from dust and dirt. In order to prevent dust from coming out of the housing 1 through the bearings 12 and 13, and in particular through the bearing 13, and penetrating the cabinet 28, the bearings 12 and 13 are made dustproof.

The device works as follows: In the position of the blade wheel 6 shown in FIG. 2, material to be weighed is fed through the material feed aperture 2 into the compartment 10 lying below the feed aperture (arrows 29). The material comes to rest on the blade extending to the left shown in FIG. 2. Through the weight of the material, the rotor has the tendency to rotate anticlockwise, in the direction of the arrow 18. This is, however, prevented by the retaining means in the form of the first and second magnets 20 and 21, which ensure that the blade wheel 6 remains in the position shown in FIG. 2. At a given point in time the quantity by weight of material in the compartment 10 lying below the material feed aperture 2 is so great that the torque exerted by said material on the rotor is so great that the retaining force exerted by the magnets 20 and 21 is overcome. The magnets 20 and 21 are no longer capable of retaining the rotor, and the rotor turns in the direction of the arrow 18. It will be clear that at the moment at which the rotor turns further the weight of the material in the compartments is closely related to the maximum magnitude of the retaining force exerted by the magnets When the rotor starts to turn, the locking pin is taken into the locking position by the electromagnet 27 so that after a rotation of the rotor through 90° the movement of the rotor is stopped through the locking pin falling into one of the apertures 26 in the disc 17. During the rotation of the rotor through 90°, one of the cams 23 has passed the electric switch 24 and has operated the switch 24. As a result, the switch 24 has sent a pulse-type signal which can be recorded elsewhere.

When the blade wheel has rotated through 90° the material present in the filled compartment falls out of said compartment again and is discharged through the discharge aperture 3 (arrow 30). At the same time the next compartment 10 has stopped below the material feed aperture 2, so that this compartment can now be filled with the material to be weighed.

Figure 2:
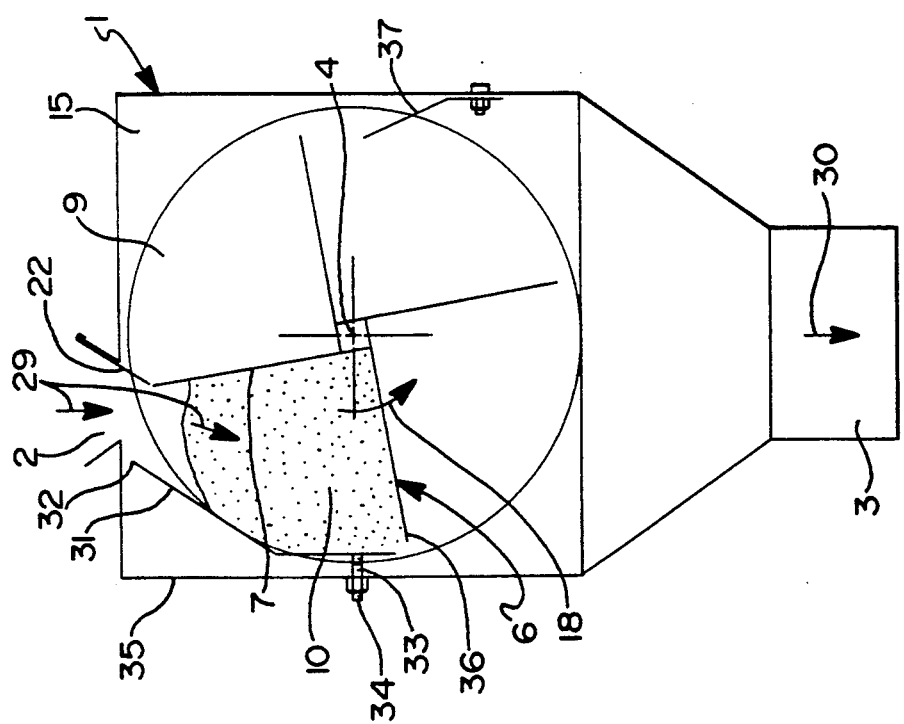
FIG. 2 is a schematic view in cross-section of the device of FIG. 1 along the line II—II.
Figure 4:
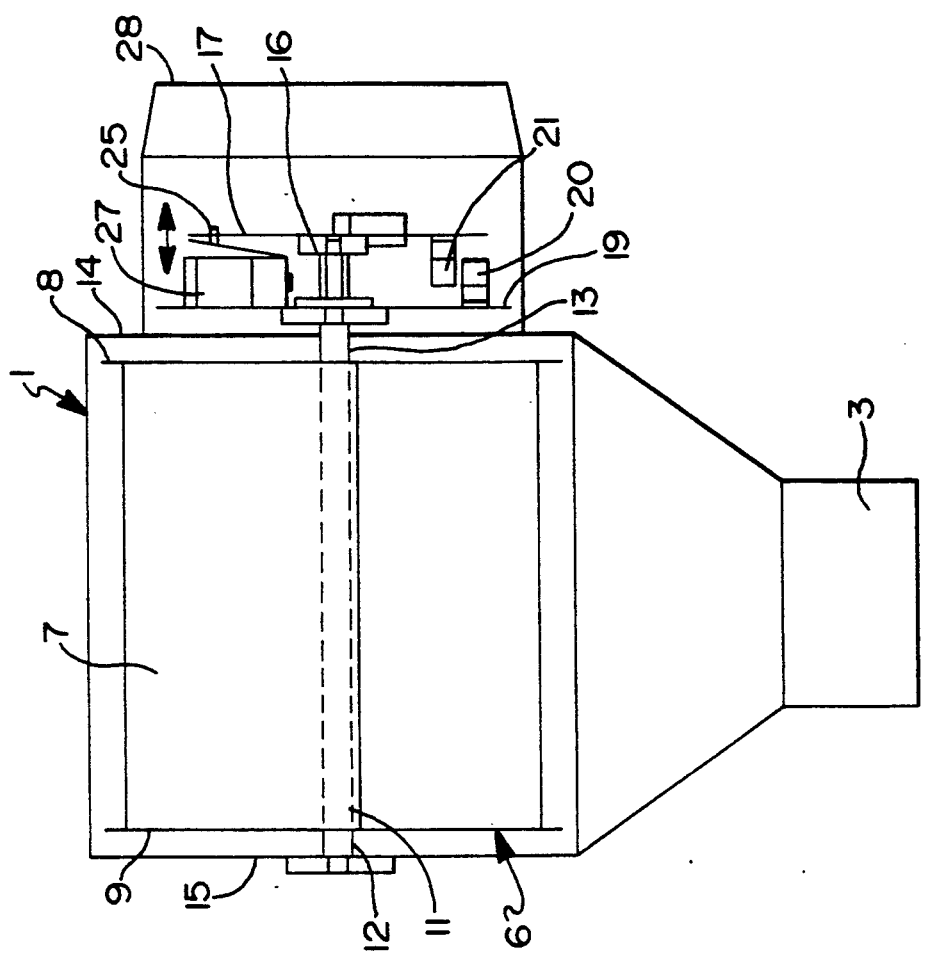
FIG. 4 is a schematic side view of the device of FIG. 1, viewed in the direction of the arrow IV.

Immediately after the rotor has been brought to a standstill by the locking pin 25, in the position shown in FIG. 2, the locking pin 25 is taken into the unlocking position again by the electromagnet 27, so that the rotor 5, and in particular the blade wheel 6, is freely rotatable again. The device is now ready for the next weighing cycle.

The weighing is very accurate, since the weight of the material in a compartment 10 is the only determining factor for the rotor 5 to turn further. The weight of the rotor 5 does not affect the weighing, since the rotor is in principle balanced. The net weight of the material is the only determining factor, and there is no tare weight, as in conventional weighing devices. Should a certain imbalance occur in the rotor, possibly due to material adhering to the rotor, its effect is completely destroyed after a rotation of the rotor through 360°.

If the magnets 20 and 21 are set up in such a way that they repel each other, after the maximum filling weight in a compartment 10 is reached the rotor 5 will very quickly rotate further, since immediately after the magnets 21 on the disc 19 have passed the magnets 20 the rotor 5 is subjected to an additional force in the direction of rotation, which is the result of the repelling action of the magnets 20 and 21. A rapid turning further of the rotor 5 is beneficial for the accuracy of weighing. The accuracy of weighing is even further increased by the fact that at the moment when the rotor turns further the upward-extending blade lies precisely opposite the material guide place 22 in material feed aperture 2.

A curved guide plate 31 is fitted inside the housing, in order to ensure that at the moment when such a weight of material is present in the compartment to be filled that the blade wheel has the tendency to turn further the centre of gravity of the material in the compartment always lies in the same place, so that the torque exerted by the material on the rotor is then also the same. Said guide plate 31 extends parallel to the axis of rotation 4 of the rotor and near the material feed aperture 2 is connected, pivoting about an axis 32, to the housing 1. At the bottom side the guide plate 31 is provided with a pin 33 which projects with play through an aperture in the housing 1 and outside the housing is provided with a stop 34. Under the influence of its own weight, the guide plate 31 will have the tendency to move in the direction of the axis 4 of the rotor. This movement is limited by the stop 34, which comes to rest against the wall 35 of the housing 1. In the direction from the axis of rotation 4 of the rotor, the guide plate 31 can be moved freely to the position in which the guide plate 31 comes to rest against the wall 35 on the inside of the housing. In the position in which the stop 34 is resting against the wall 35 of the housing on the outside, the plane of the guide plate 31 lies just outside the cylindrical face in which the outermost edges 36 of the blades 7 are situated. This means that the blades 7 never come into contact with the guide plate 31. The material in the compartment 10 to be filled does come to rest against the guide plate 31, so that the material in the compartment 10 has a more or less fixed boundary face on the outside, and as soon as the rotor 5 turns further the centre of gravity of the material in a filled compartment 10 always lies the same distance away from the rotor 5.

In order to prevent the blade wheel 6 from turning back in the opposite direction to the direction of the arrow 18 after the blade wheel 6 has rotated further and the blade wheel 6 has been released by the locking pin 25, the housing contains a flexible check lip 37 which extends upwards at an angle inside the cylinder face in which the outside edges of the blades 7 are situated. During the further turning of the rotor the force exerted on the blade wheel 6 by the check lip 37 will only be small while, on the other hand, if the blade wheel 6 is tending to turn back, the blade wheel 6 is retained by the check lip 37 through the fact that a blade 7 comes to rest against the free end of the check lip 37.

Figure 5:
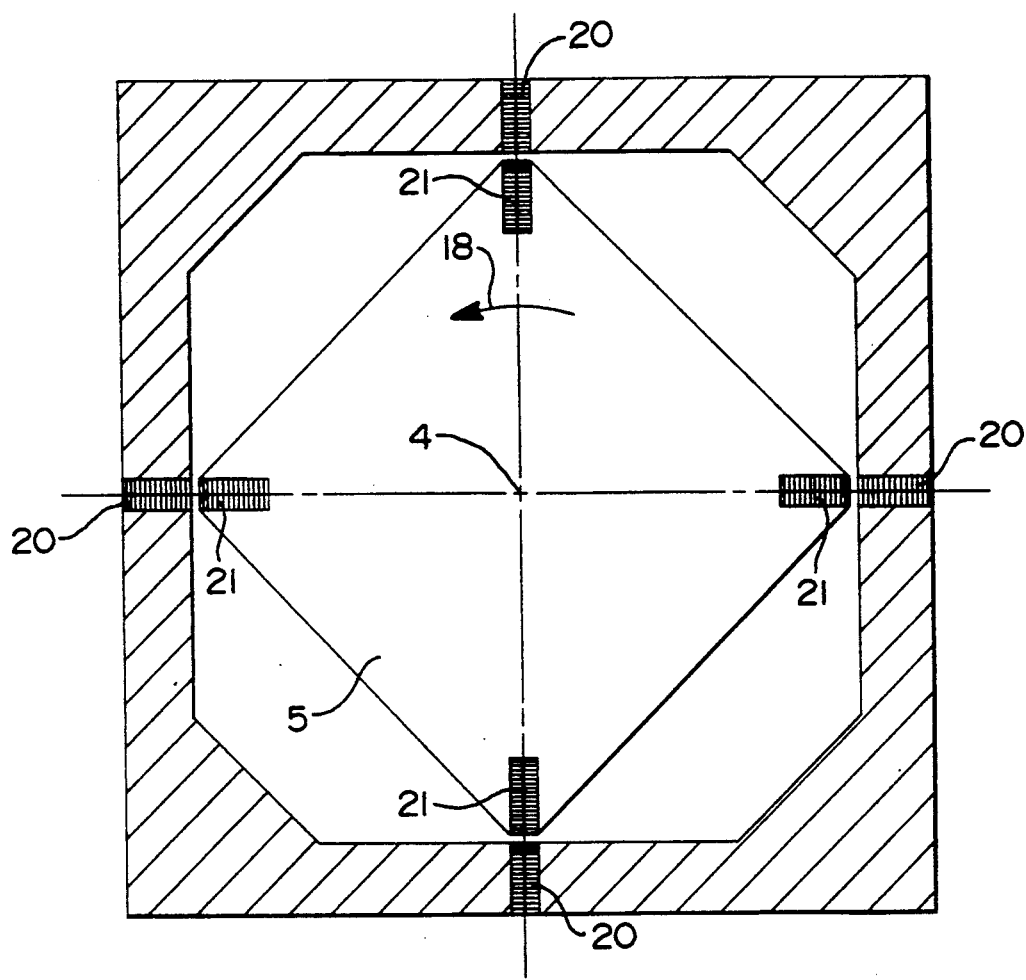
FIG. 5 is a schematic view of a particular embodiment of the retaining means with permanent magnet for the rotor of the device of FIG. 1.

FIG. 5 shows schematically a magnetic system to be used for retaining the rotor, having four fixed permanent magnets 20 and four permanent magnets 21 connected to the rotor 5. The retaining force is always supplied by four pairs of magnets. In this way the retaining force can be very constant. Besides, the retaining force can be set simply and accurately by changing the position of only one of the magnets 20.

Figure 6:
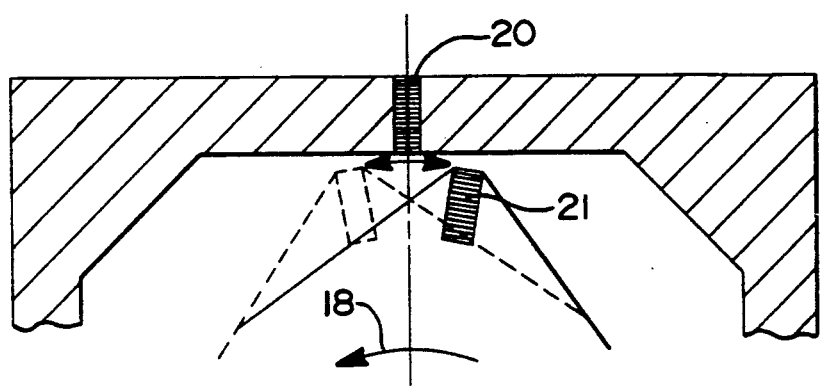
FIG. 6 shows a part of the system of FIG. 5, in which the working of the magnets is indicated.

FIG. 6 shows the operation of two magnets 20 and 21 of the magnetic system shown in FIG. 5 which repel each other. If the rotor is rotating in the direction of the arrow 18, the rotor will be retained in the position shown by solid lines by the repelling action of the magnets 20 and 21. This repelling force has a maximum magnitude. When this force is overcome under the influence of a specific weight of material in a compartment of the rotor 5, the rotor will turn further in the direction of the arrow 18. The magnet 21 goes into the position shown by dotted lines, on the other side of the magnet 20. The repelling action of the magnets 20 and 21 ensures that the rotor 5 is subjected to an additional force in the direction of rotation 18, as a result of which the rotor 5 will rotate further very fast.

The calibration of the weighing device can be very simple. During fitting all devices are put at the same settings. The user measures for a particular type of material the weight of the material put through it after a particular number of rotations (strokes) of the rotor (for example, 10 rotations). This provides the weight of the material in a compartment at the moment when the rotor turns further. This figure can then be used further, for example fed into a computer.

Figure 7:
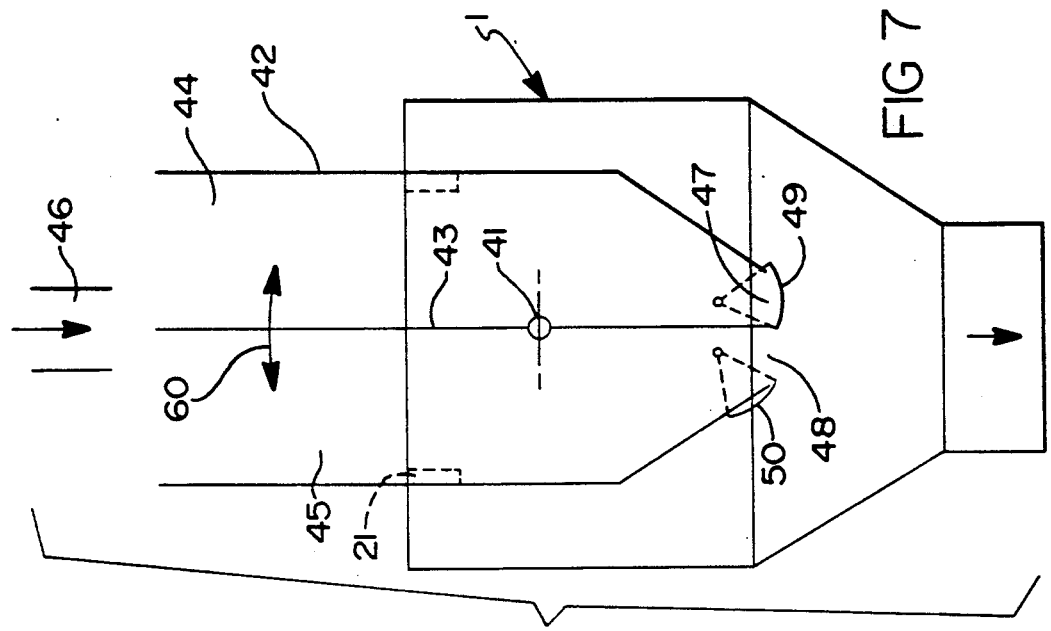
FIG. 7 is a schematic view in cross-section of another embodiment of the device according to the invention.

FIG. 7 shows very schematically a possible other embodiment of a device according to the invention. Here the rotor comprises a pan 42 which is tiltable about a fixed axis 41 and is provided with a partition 43. Two compartments 44 and 45 are formed in this way. A material feed aperture 46 is fitted above the pan. On the bottom side the compartments 44 and 45 are provided with material discharge apertures 47 and 48. The pan 42 in principle has two positions, i.e. tilted to the left or tilted to the right. The forward and back or to and from (arrows 60) movement of the pan 42 performs a similar function to the rotating blade wheel 6 as shown in FIG. 6. When the pan 42 is tilted to the left, the compartment 44 can be filled with material to be weighed. At the bottom side the material discharge aperture 47 is shut off by a plate 49 which is hingedly connected to the pan 42. Under the influence of the weight of the material in the compartment 44, the pan 42 will have the tendency to tilt to the right. This tilting movement is blocked by retaining means in the form of magnets, in essentially the same way as that described with reference to the embodiment shown in FIGS. 1 to 6. When the torque exerted by the material in the compartment 44 on the pan 42 overcomes the retaining force exerted by the magnets, the pan 42 will tilt to the right, so that the material discharge aperture 47 is opened and the compartment 45 comes to rest below the material feed aperture 46. The discharge aperture 48 is then shut off by the plate 50. In this position also, a tilting to the left is prevented by retaining means in the form of magnets during filling of the compartment 45.

The advantages of the device described above for weighing powdered or granular material during its throughflow can be summarized as follows:

The weighing is very accurate for, inter alia, the following reasons:
a) No transmission mechanisms are present, so that the accuracy of the weighing is not affected by friction forces which occur in such transmission mechanisms;
b) The weighing mechanism has no reciprocating parts which slide over one another, but is in fact only a rotating rotor which is supported at the shaft, so that the influence of the friction forces (bearing friction) is negligible;
c) The rotor is in principle in balance, so that only the product is weighed, and the weight of the rotor plays no role (there is no tare weight as in conventional weighing systems); the influence of any imbalance, for example through material adhering to the rotor, is completely eliminated after a rotation of the rotor through 360°;

d) Through the use of a magnetic system, a retaining force is exerted on the rotor without there being any mechanical contact with the rotor;

e) With the use of magnets (N—N or Z—Z) which repel each other, after the maximum quantity of material in a compartment is reached the rotor turns further very quickly, due to the repulsion of the magnets;

f) When the maximum quantity of material in a compartment is reached, the centre of gravity of the material is accurately positioned (through use of the guide plate).

The accuracy of weighing which can be achieved is approx. 0.1%. In a device according to the state of the art with a balance arm this accuracy is approx. 2%.

The device can be used in very dusty environments, since the weighing mechanism is accommodated in a dustproof and waterproof cabinet. The accuracy of the weighing is not influenced by dust and dirt.

The design of the device is simple and relatively cheap.

What is claimed is:

1. A device for weighing free-flowing or strewable solid material, in particular granular or powdered material during throughflow comprising:
   (a) a housing which is enclosed on all sides and having a first surface with a feed aperture formed therein and a surface with a discharge aperture formed therein;
   (b) a rotor disposed within the housing which is essentially freely rotatable about an essentially fixed horizontal axis of rotation, and has at least two adjacent compartments;
   (c) means for feeding material through the feed aperture to be weighed to one of the compartments of the rotor; and
   (d) means for retaining which acts on the rotor, and comprising a magnetic system which exerts on the rotor a retaining force of a predetermined maximum magnitude acting in the opposite direction of rotation of the rotor.

2. The device of claim 1, wherein the magnetic system comprises at least one permanent magnet which is mounted off the rotor in a fixed position relative to the axis of rotation, and also, noting therewith, another magnetic or magnetizable element which is mounted on the rotor in a fixed position relative to the axis of rotation of the rotor, and which always lies a distance away from the permanent magnet.

3. The device of claim 1, wherein the magnetic system comprises at least one first permanent magnet which is mounted of the rotor in a fixed position relative to the axis of the rotation of the rotor, and at least one second permanent magnetic which is mounted on the rotor and which can move up to and opposite at least one first permanent magnet.

4. The device of claim 3, wherein the at least one first and the at least one second magnet are arranged in such a way that they repel each other.

5. The device of claim 1, provided with locking means for locking the rotor in a particular position.

6. The device of claim 1, provided with detection means for detecting the number of rotations of the rotor.

7. The device of claim 1, wherein the rotor comprises at least one part in the form of a blade wheel with at least two blades which extend outward from and parallel to the axis of rotation of the rotor, and which help form the compartments of the rotor and, lie at equal angular distances from each other.

8. The device of claim 7, wherein the blade wheel is accommodated in an essentially closed housing which is provided at the top side with a material feed aperture and at the bottom side with a material discharge aperture, and the blade wheel being mounted on a shaft whose axis coincides with the axis of rotation of the rotor, and which is supported in the housing on either side of the blade wheel and at one side projects outside the housing.

9. The device of claim 3, wherein the rotor has a shaft, said shaft having fitted on it a disc on which the at least one second permanent magnet is fitted.

10. The device of claim 3, wherein the rotor has a shaft, said shaft having fitted on it a disc on which the at least one second permanent magnet is fitted, the number of second permanent magnets on the disc is the same as the number of compartments of the rotor, and the second permanent magnets lie at equal distances from the axis of rotation of the rotor and lie at equal angular distances from each other.

11. The device of claim 3, wherein the rotor has a shaft, said shaft having fitted on it a disc on which at least one second permanent magnetic is fitted, the number of first, fixed, permanent magnets is the same as the number of compartments of the rotor, and the first permanent magnets lie at equal distances from the axis of rotation of the rotor, lie equal angular distances from each other.

12. The device of claim 10, wherein the number of first, fixed, permanent magnets is the same as the number of second permanent magnets on the disc, and the angular distance between the first permanent magnets is equal to the angular distance between the second permanent magnets.

13. The device of claim 6, wherein the locking means comprises a pin fixedly mounted to an electromagnet which is retracted in an unlocking position and released forward to a locking position by the fixed electromagnet and which in the locking position falls into a locking aperture in a disc fitted on the shaft of the rotor, the number of locking apertures in the disc corresponding to the number of compartments of the rotor, and the angular position of the locking apertures being related to the angular position of the compartments relative to the shaft of the rotor.

14. The device of claim 7, wherein the detection means comprise cams provided on the periphery of a disc fitted on the shaft of the rotor, and also a fixed switch which is operated by the cams on the periphery of the disc, and the number of cams on the disc corresponds to the number of compartments of the rotor, and the angular position of the cams being related to the angular position of the compartments relative to the shaft of the rotor.

15. The device of claims 1, provided with locking means for locking the rotor in a particular position and detection means for detecting the number of rotations of the rotor, wherein the retaining means, the locking means and the detection means are accommodated in a closed cabinet situated next to the rotor in axial direction.

16. The device of claim 7, wherein the compartments of the rotor are formed by blades extending essentially radially from and parallel to the axis of rotation of the rotor, and by end plates which are fitted on the two axial ends of the blade wheel and which lie at right angles to the axis of rotation of the rotor and are connected to the side edges of the blades.

17. The device of claim 16, comprising a screening plate extending parallel to the axis of rotation of the rotor and from the material feed aperture extending downwards at an angle in the direction of rotation of the rotor, while the face of the screening plate lies close to the cylinder face in which the outermost end edges of the blades, viewed in the radial direction, are situated, the screening plate being hingedly fitted on a shaft lying near the material feed aperture and extending parallel to the axis of rotation of the rotor.

18. The device of claim 1, provided with a check element which is designed to prevent rotation of the rotor in the opposite direction to the intended direction of rotation of the rotor, without the rotor being impeded by the check element during rotation in the intended direction of rotation.

19. The device of claim 1, wherein the check element is a flexible lip, standing at an angle towards the axis of rotation of the rotor and the free end of which extends inside the cylinder face formed by the outer envelope of the rotor.

20. The device of claim 1, wherein the rotor has a pan which can be tilted forward and backward or to and frow about a rotor shaft, and which is provided with a partition for the formation of two adjacent compartments which are open of the top side and are provided with closable material discharge apertures at the bottom.

21. The device of claim 1, wherein the magnet which is mounted on the rotor and, also, mating therewith, another magnetic or magnetizable element which is mounted off the rotor in a fixed position relative to the axis of rotation of the rotor, and which always lies a distance away from the permanent magnet.

* * * * *